United States Patent [19]

Oishi et al.

[11] Patent Number: 4,500,050

[45] Date of Patent: Feb. 19, 1985

[54] MAGNETIC TAPE CASSETTE

[75] Inventors: Kengo Oishi; Osamu Suzuki, both of Kanagawa, Japan

[73] Assignee: Fuji Photo Film Co., Ltd., Kanagawa, Japan

[21] Appl. No.: 522,761

[22] Filed: Aug. 12, 1983

[30] Foreign Application Priority Data

Aug. 19, 1982 [JP] Japan .......................... 57-124452[U]

[51] Int. Cl.³ ............................................. G11B 15/08
[52] U.S. Cl. ..................................... 242/198; 242/188
[58] Field of Search ............... 242/198, 199, 197, 186, 242/188; 360/92, 96.1, 96.5, 132, 130.3, 137, 74.6

[56] References Cited

U.S. PATENT DOCUMENTS 3,615,155 10/1971 Gelbman .............................. 242/188
4,091,426  5/1978 Umeda ............................. 242/188 X
4,368,860  1/1983 Goto ................................... 242/199
4,449,676  5/1984 Ogata et al. ........................ 242/198

Primary Examiner—Stuart S. Levy
Assistant Examiner—Leo J. Peters
Attorney, Agent, or Firm—Sughrue, Mion, Zinn, Macpeak, and Seas

[57] ABSTRACT

A magnetic tape cassette includes a reel retaining plate for urging hubs of take-up and supply reels vertically downward to achieve uniform tape recording and playback characteristics. The reel retaining plate contains a plurality of protrusions at its central portion which engage with a plurality of vertically extended grooves that are contained in a cylindrical wall which is located on a lower cassette half, the cylindrical wall defining an insertion hole for a light emitting element of a photosensor. The reel retaining plate is held between a top surface of the cylindrical wall and an inner surface of an upper cassette half.

6 Claims, 3 Drawing Figures

MAGNETIC TAPE CASSETTE

BACKGROUND OF THE INVENTION

The present invention relates to a magnetic tape cassette and, more specifically, to a video magnetic tape cassette in which a reel retaining plate depresses the tops of hubs of a pair of tape reels to urge the tape reels in an axial direction. The depression force of the reel plate helps ensure that a tape is transported from reel to reel at a constant speed, and it is precisely positioned in the vicinity of read, write and erase heads in a recorder as the tape is transported. In addition, the reel retaining plate provides centers of rotation for the tape reels.

Heretofore, in a video tape cassette, a reel retaining plate suitably depresses central portions of the hubs of the reels in order to allow the reels to rotate smoothly so that the tape is transported in a uniform manner, thus improving the picture recording and reproducing quality of the cassette. The reel retaining plate is made from an elastic material and is mounted on an upper cassette half. The plate or its contact portions are bent in the direction of depression and are brought into contact with the tops of the hubs. The end portions of the reel retaining plate are usually bent and lightly depress the tops of the hubs.

FIG. 1 shows a conventional reel retaining plate 3, the plate 3 being supported like a cantilever from the upper cassette half. According to this construction, the plate must be rigidly secured to the upper cassette half, and the plate is therefore secured at the two points 7 by pressurizing, heating, adhering or ultrasonic welding. If the plate 3 is not positively secured at the two points 7, the plate 3 will play. As a result, the depression force of the end portions 11 of the plate 3 on the hubs becomes irregular. This has an adverse effect on the positioning and running speed of the tape as it is transported from reel to reel, and, accordingly, picture recording and reproducing characteristics are adversely affected. Furthermore, the tape may be wound unsatisfactorily. In small video tape cassettes, the space for mounting the reel retaining plate is very small, and, therefore, the above-described problem becomes more serious, and the reel retaining plate must be mounted more carefully.

SUMMARY OF THE INVENTION

An object of the present invention is to eliminate the above-described difficulties which accompany a conventional magnetic tape cassette.

More specifically, in order to eliminate the abovedescribed difficulties which accompany a conventional magnetic tape cassette and further to automatically stop the running of the tape, the inventor has perceived the utilization of an insertion hole through which a light emitting element of a photo-sensor is inserted, and which is positioned at a central portion of the front lower side of the conventional cassette. That is, when the video cassette is set in a video tape recorder (VTR), a light emitting element 9 is inserted into the insertion hole from the VTR side. When the video cassette is in use, the light emitted from the light emitting element is adapted to illuminate the portion of the tape adjacent the reels through the slits provided in the wall of the insertion hole. For example, after the recording and reproducing operation is terminated, a leader tape, which is transparent or semitransparent and is located at the end of the tape, is drawn out. In this case, through slits 15, the leader tape and openings 12 provided in the side wall of the upper cassette half, the light is sensed by a light receiving element provided at the VTR side, to thereby automatically stop the running of the tape.

The walls of the insertion hole are used to positively fixedly mount the reel retaining plate by the use of interengaging groove and protrusions.

Thus, the present invention provides positive holding of a reel retaining plate using an insertion hole for the light emitting element of a photo-sensor, as well as a tape cassette having excellent running characteristics.

The foregoing object and other objects of the present invention are achieved by providing a magnetic tape cassette comprising: a lower cassette half which has a light emitting element insertion hole; an upper cassette half which is secured to the lower cassette half; a tape supplying reel and a tape winding reel which are juxtaposed in the cassette; and a reel retaining plate which is made from an elastic material which depresses the tops of the hubs of the reels. The light emitting element insertion hole has a cylindrical wall which contains a plurality of vertically extended grooves, and the reel retaining plate contains a plurality of protrusions at its central portion, the protrusions being engaged with the grooves so that the central portion of the reel retaining plate is held between the top surface of the cylindrical wall and the inner wall of the upper cassette half.

DESCRIPTION OF THE PREFERRED EMBODIMENTS

Figure 2:
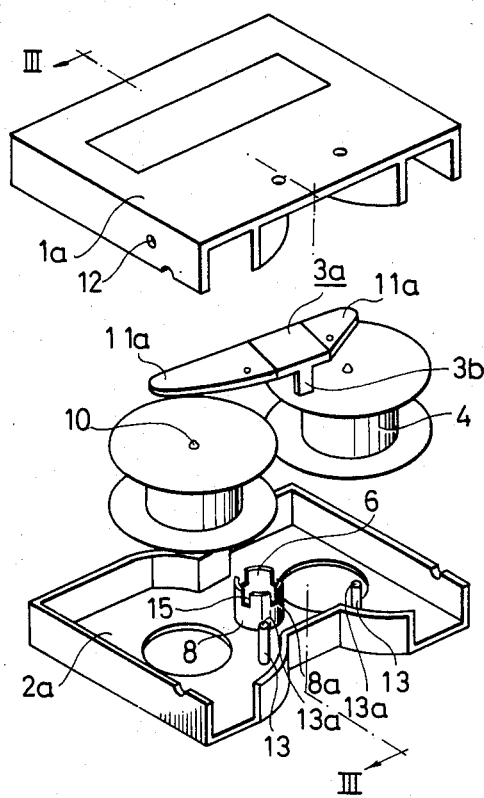
FIG. 2 is an exploded perspective view showing one embodiment of the present invention.

One example of the magnetic tape cassette according to the present invention will be described with reference to FIGS. 2 and 3. FIG. 2 is an exploded perspective view which shows a preferred embodiment of a cassette according to the present invention, and FIG. 3 is a sectional view which shows the essential components of the cassette of FIG. 2.

In these figures, a pair of tape reels 4 are accommodated in the lower cassette half 2, and a reel retaining plate 3a is mounted over the reels. A cylindrical wall 8 of an insertion hole 6 for a light emitting element 9 of a photo-sensor is positioned in the lower cassette half 2 and is used as a mount for mounting reel retaining plate 3a. The element 9 is typically an LED. More specifically, the cylindrical wall 8 is integral with the lower cassette half floor portion 2a, and the reel retaining plate 3a contains protrusions 3b which engage front and back grooves 8a that are cut into the outer surface of the cylindrical wall 8 so that the plate 3a may be fixedly mounted. A pair of slits 15 in the wall 8 and opening toward the sides of the cassette allow the passage of light therethrough to the apertures 12, behind which light receiving elements are provided in the VCR. The light emitting element 9 and the light receiving elements in the VCR together form a photosensor device for detecting a tape end. The upper cassette half 1a is placed over the plate 3a, and the upper and lower cassette halves are fixedly fastened together with screws or the like.

Figure 1:
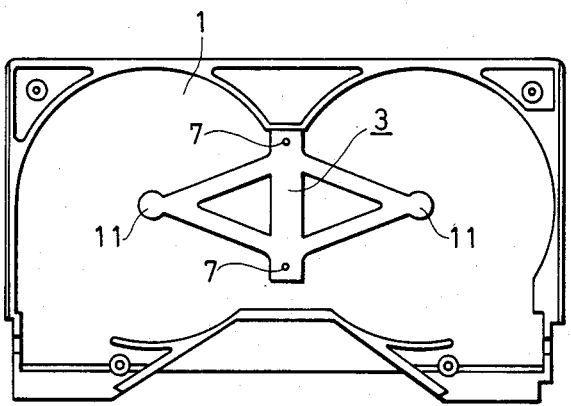
FIG. 1 is a plan view showing an upper half of a conventional video tape cassette.
Figure 3:
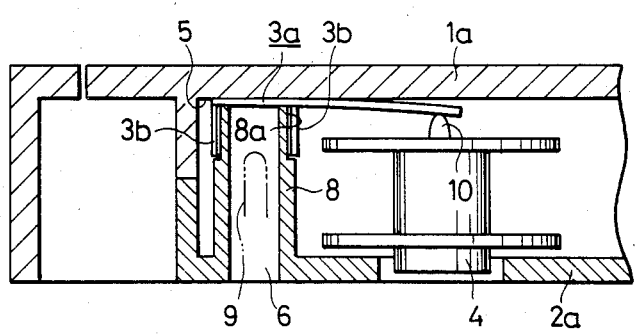
FIG. 3 is a sectional view showing the essential components of FIG. 2.

The reel retaining plate 3a is positioned when the protrusions 3b are engaged with the grooves 8a, and the reel retaining plate is held between the top surface of the cylindrical wall 8 and the inner wall 5 of the upper cassette half 1a as shown in FIG. 3 so that end portions 11a depress the tops 10 of the reels 4, respectively. If means for fixedly securing the upper and lower cassette halves are provided near the insertion hole for the light emitting element 9, the reel retaining plate 3a may be more positively secured.

That is, a part of the reel retaining plate 3a can be held by means of fasteners such as screws provided near the light emitting element insertion hole, which engage in screw posts or ribs 13 having threaded apertures 13a.

In the magnetic tape cassette according to the present invention, the cylindrical wall of the light emitting element insertion hole is utilized as a reel retaining plate mounting means. Therefore, in the cassette of the present invention, the space required for installing the reel retaining plate is smaller than in the conventional cassette, and yet the reel retaining plate can be held more positively. This result is highly efficient, especially when small video cassettes are used.

What is claimed is:

1. A magnetic tape cassette comprising:
    a lower cassette half having a light emitting element insertion hole therein, said insertion hole being defined by a cylindrical wall having a plurality of vertically extending grooves;
    an upper cassette half secured to said lower cassette half;
    a tape supplying reel and a tape winding reel juxtaposed in said cassette inside a space defined by said upper and lower cassette halves; and
    a reel retaining plate having opposite end portions which depress tops of said reels, said reel retaining plate having a plurality of protrusions at a central portion thereof, said protrusions being engaged with said grooves of said cylindrical wall such that a central portion of said reel retaining plate is held between a top surface of said cylindrical wall and an inner wall of said upper cassette half.

2. The cassette as claimed in claim 1, wherein said reel retaining plate is made of an elastic material.

3. The cassette as claimed in claim 1, said cylindrical wall further including at least one slit therethrough for passing light emitted by said light emitting element, and at least one of said cassette halves including at least one aperature for passing light emitted through said slit to a light receiving element positioned behind said aperture, when said cassette reaches an end of tape condition.

4. The cassette as claimed in claim 2, further comprising means for fixedly securing said upper and lower cassette halves together, said securing means being located near said cylindrical wall.

5. The cassette as claimed in claim 2, further comprising fastener receiving means located near said insertion hole, and fastener means for securing said plate to said fastener receiving means.

6. The cassette as claimed in claim 5, wherein said fastener receiving means comprises at least one screw post.

* * * * *